Sept 10, 1957     B. W. KEESE     2,805,743
VEHICLE DRIVE MECHANISM
Filed May 25, 1951     4 Sheets-Sheet 2
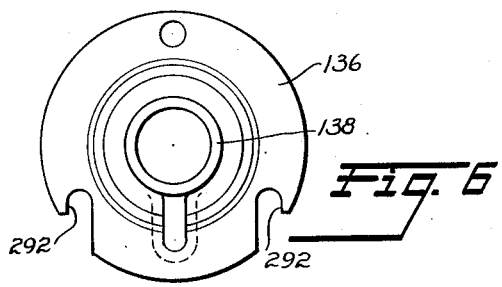
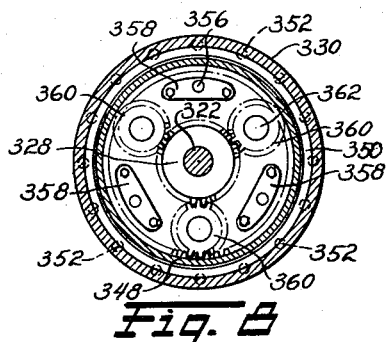
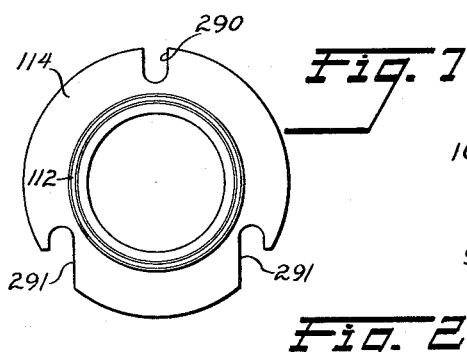
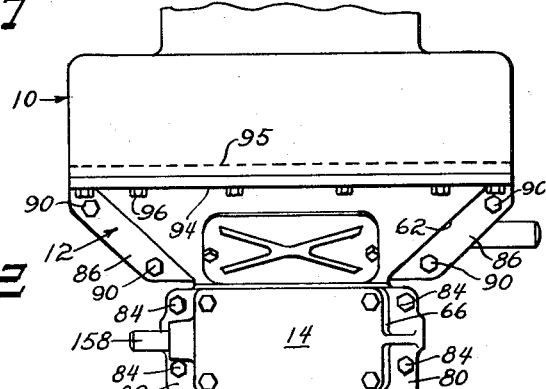
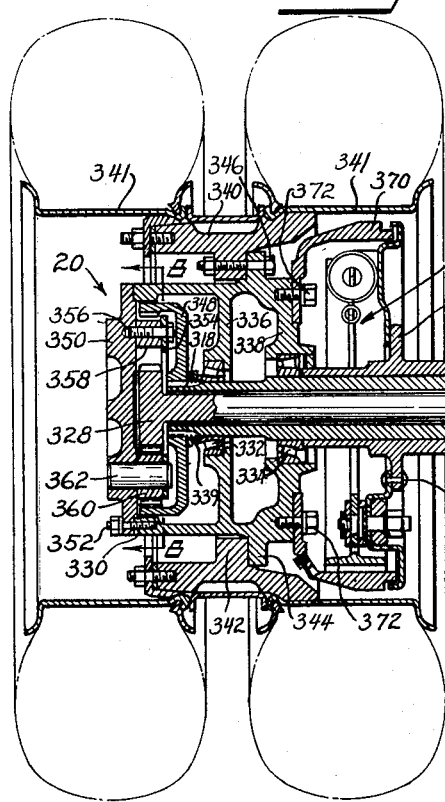
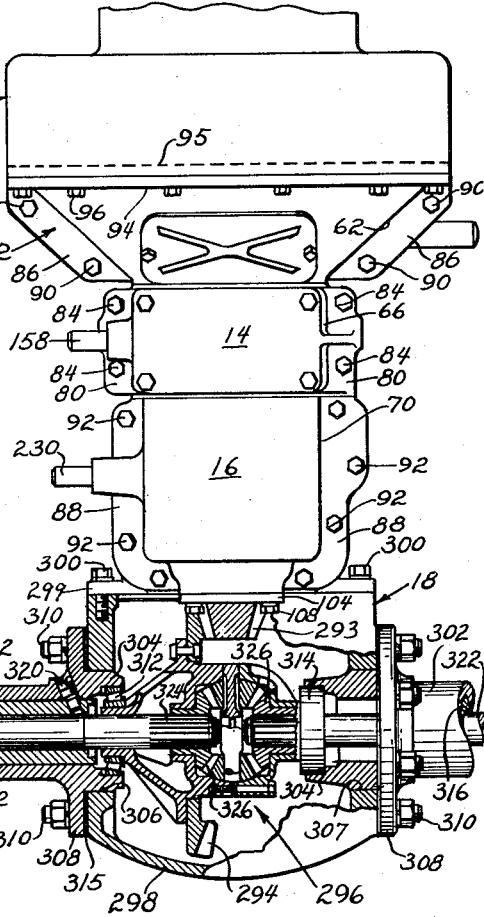
INVENTOR.
BEVERLY W. KEESE
BY
*Strauch, Nolan & Diggins*
ATTORNEYS

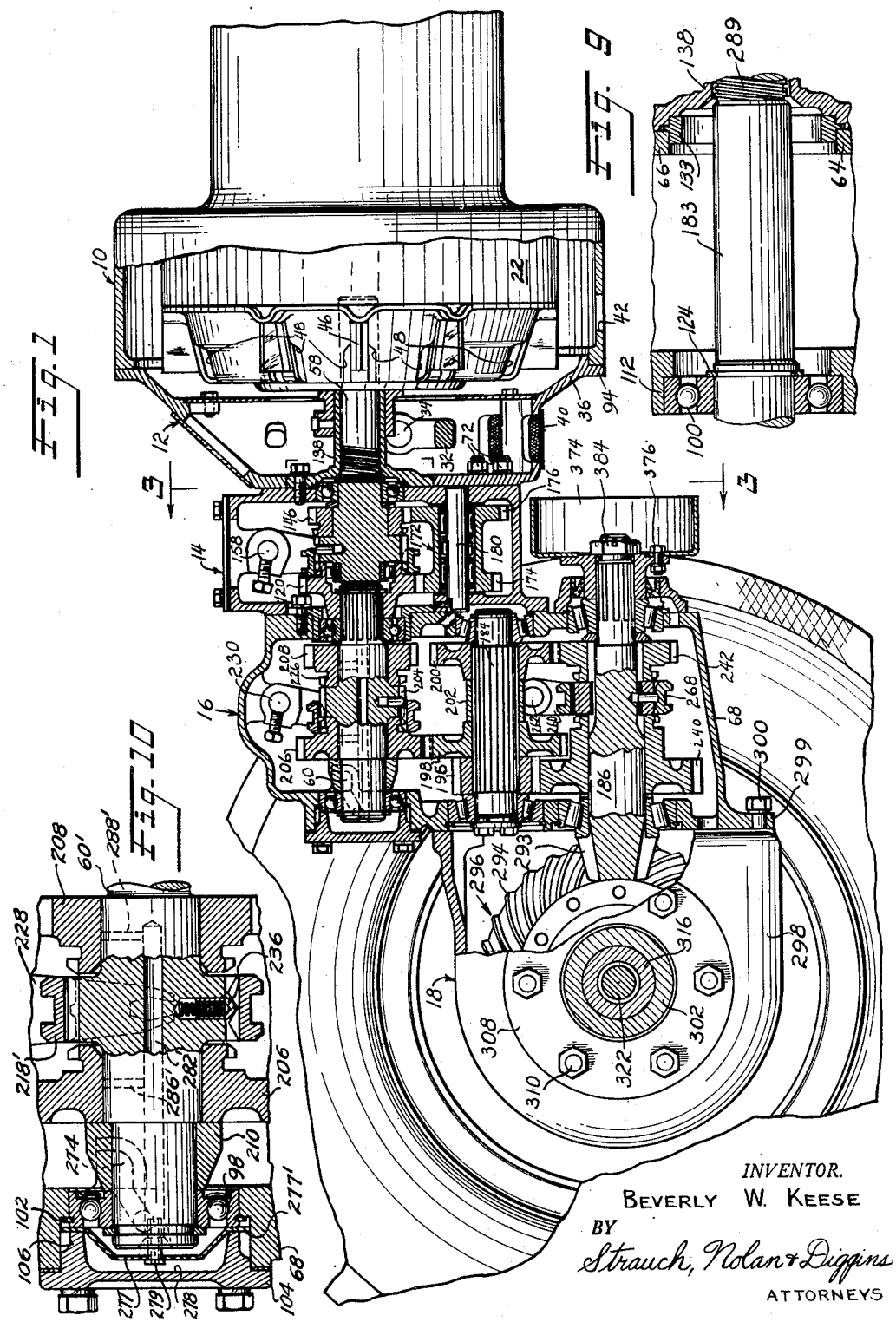

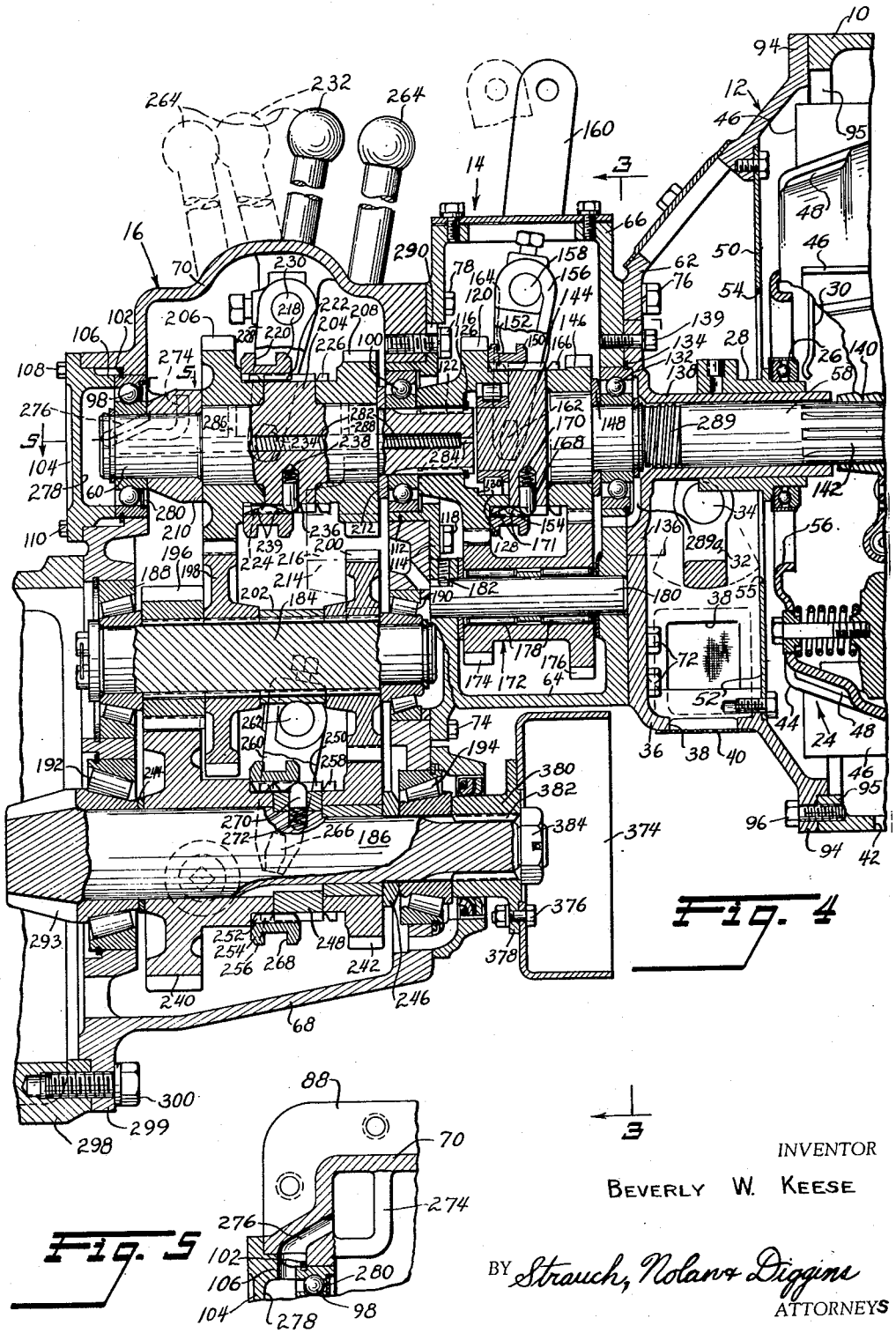

United States Patent Office 2,805,743
Patented Sept. 10, 1957

2,805,743

VEHICLE DRIVE MECHANISM

Beverly W. Keese, Oshkosh, Wis., assignor, by mesne assignments, to Rockwell Spring and Axle Company, Coraopolis, Pa., a corporation of Pennsylvania Application May 25, 1951, Serial No. 228,178

3 Claims. (Cl. 192—3.5)

This invention relates to improvements in the vehicle drive mechanism of engine driven vehicles, and more particularly to improvements in the vehicle drive mechanism of such vehicles which in operation must be subjected to frequent engagement with and disengagement from the engine power shaft. One type of vehicle subjected to this form of operation is known commercially as a shop truck.

In vehicles of this type, rapid wear of certain of the component parts of the mechanism and requirements of frequent servicing result from this frequent engagement and disengagement of the drive mechanism from the engine.

It is accordingly the general object of this invention to provide an improved vehicle drive mechanism for such vehicles which is so constructed and arranged as to reduce wear upon the parts thereof and to facilitate servicing thereof when necessary.

In drive trains of vehicles of this type, great difficulty has been encountered in the past in preventing excess wear upon the clutch element. This excess wear results from overheating of the clutch element due to the fact that the clutch is in practically constant use for engaging and disengaging the drive train from the power shaft.

It is accordingly an important object of this invention to provide means for cooling the elements of a clutch of a vehicle of this type to prevent overheating and excessive wear.

More specifically it is an object of this invention to provide a clutch assembly and housing for a vehicle of this type in which an air pump is provided for causing air to circulate over the clutch elements from an intake to an exhaust port formed in the clutch housing.

Still more specifically it is an object of this invention to provide a clutch housing for a vehicle of this type having an induced draft cooling system comprising air intake and exhaust ports and an air guide structure within the housing and an air pump for forcing the air through the exhaust port.

It is another important object of this invention to provide in an engine driven vehicle, a power transmission assembly having a housing structure formed of cooperating housing halves separable along a parting plane passing through the axis of the shaft on which the engine clutch is mounted so that the engine clutch and its associated driven shaft may be readily removed for repair or replacement.

It is a further important object of this invention to provide an improved holding brake arrangement for an engine driven vehicle wherein a brake mechanism is provided which, when actuated, operates directly to inhibit rotation of the shaft driving the differential mechanism of the drive axle.

More specifically it is an object of this invention to provide an improved drive mechanism for an engine driven vehicle wherein the drive pinion of a drive axle differential mechanism is fixed for rotation with the power output shaft of a transmission unit and wherein brake mechanism is provided, which, when actuated, operates directly to inhibit rotation of the transmission unit power output shaft to provide a more powerful and effective vehicle braking action due to the mechanical advantage gained through the differential unit.

It is a more specific object of this invention to provide an improved drive mechanism for an engine driven vehicle wherein planetary gear type reduction gears are provided at the hub of the drive axle, wherein the drive pinion of the drive axle differential mechanism is fixed for rotation with the power output shaft of the transmission unit, and wherein a brake mechanism is provided, which, when actuated, operates directly to inhibit rotation of the transmission unit power output shaft to provide a more powerful and effective vehicle braking action due to the mechanical advantage gained through the differential unit and the planetary gear type reduction gears at the hub.

Another important object of this invention is to provide in connected creeper gear and transmission units, new and improved means for lubricating certain bearings of the power input shaft of the drive mechanism which are located above the level of the oil bath therein, including oil receptacles formed within the housing structure for the collection of oil thrown from the gears during operation and oil channels formed through the shaft for feeding and distributing oil to the several bearings.

A further important object of this invention is to provide an improved arrangement of power transmission gearing between the power input and power output shafts of a transmission unit wherein power input, intermediate, and power output shafts are journalled for rotation about spaced parallel axes, wherein alternatively operable forward and reverse drive gearing interconnects the power input and intermediate shafts, wherein change speed gearing interconnects the intermediate and power output shafts, and wherein clutch means are provided for connecting either or neither of the change speed gear trains to the power output shaft whereby all of said gears are maintained in constant rotation so long as the power input shaft is driven.

Another important object of the present invention is to provide an improved planetary gear type reduction mechanism at the hubs of the drive axle wherein a plurality of planetary pinions are journaled for rotation upon stub shafts fixed relative to the wheel shell in constant mesh with an internal annular gear fixed to the axle housing and with the centrally located spur gear directly coupled to be driven by one of the side gears of the axle assembly differential mechanism.

These and other objects of this invention will become apparent as the following detailed description proceeds in connection with the accompanying drawings wherein like reference numerals have been used to designate like parts and wherein:

Figure 1 is a view of the general vehicle drive train layout which is a fragmentary vertical sectional view substantially along the center line of the vehicle;

Figure 2 is partially sectional fragmentary plan view of the vehicle drive train showing the differential unit and one-half of the drive axle assembly in cross-section;

Figure 3:
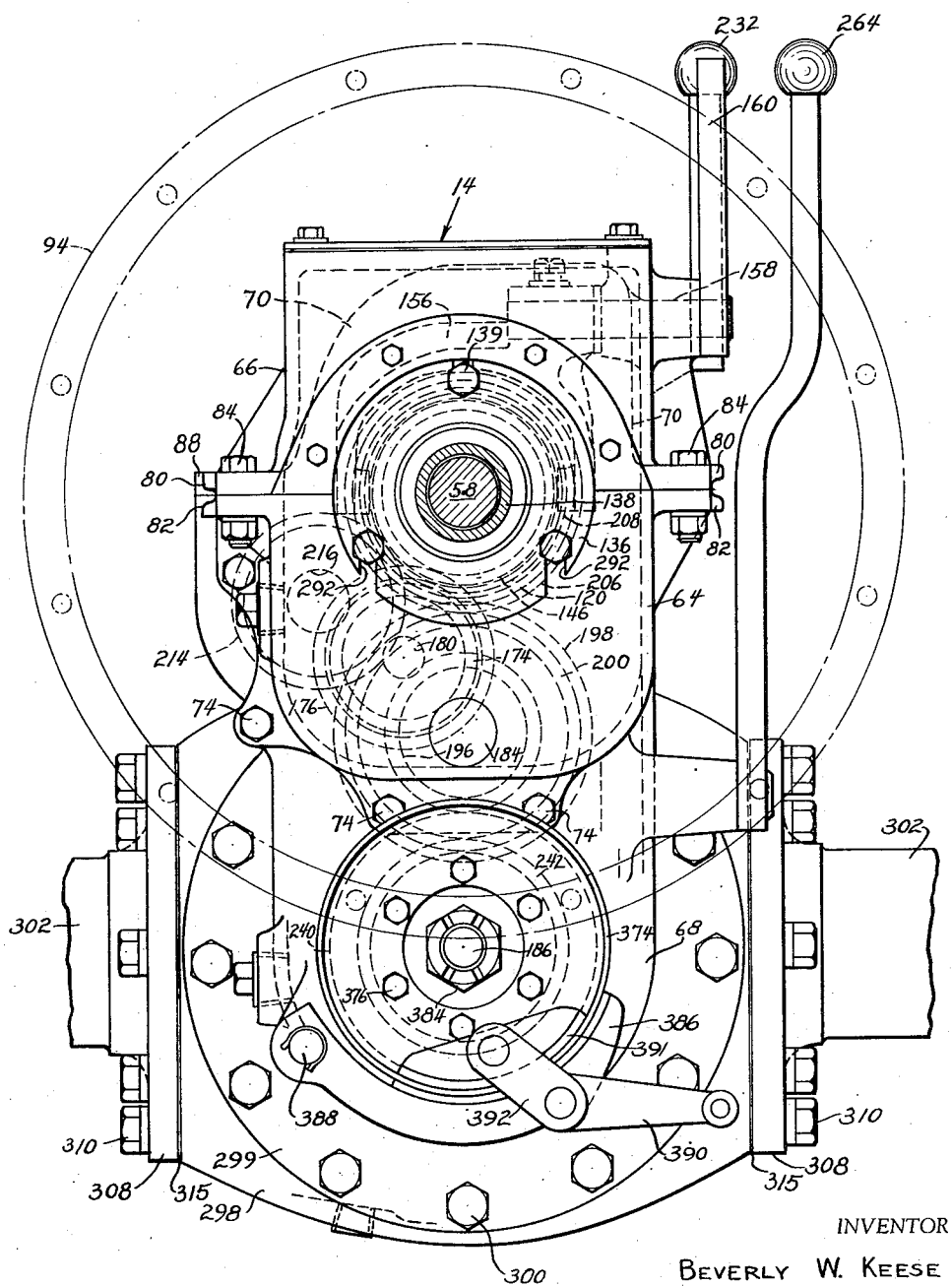
Figure 3 is a sectional view taken along the lines 3—3 of Figures 1 and 4.

Figure 4 is an enlarged sectional view of the clutch, creeper gear, and transmission units, the section planes passing through the vertically aligned axes of the power input, intermediate, and power output shafts of the transmission unit, through the axes of the transmission unit power input shaft and the creeper gear shaft on the creeper gear unit, and vertically through the axis of the clutch driven shaft in the clutch unit;

Figure 5 is a fragmentary sectional view taken along the line 5—5 of Figure 4;

Figure 6 is a front end view of the clutch actuating sleeve support 138;

Figure 7 is a rear end view of the bearing cage 112;

Figure 8 is a sectional view of the hub planetary type reduction gearing taken along the line 8—8 of Figure 2;

Figure 9 is a fragmentary sectional view showing modification of the vehicle drive train in which the creeper gearing is eliminated; and Figure 10 is a fragmentary sectional view of the rear end portion of the transmission unit power input shaft showing a modified lubrication system for the gears journalled thereon.

*General*

The shop truck transmission and final drive mechanism of the present invention, as is shown in Figure 2, consists generally of a bell housing 10, clutch unit 12, creeper unit 14, transmission unit 16, differential unit 18, and at the axle outer ends, planetary gear reduction mechanism 20. As is apparent from Figure 1, the mechanism of these units is so interconnected that power is transmitted from an engine driven fly wheel 22 through the clutch unit 12, creeper gear unit 14, and transmission unit 16 to the differential mechanism 18. As is shown in Figure 4, the operating mechanism 24 of the clutch unit 12 is a generally conventional normally engaged plate type clutch commonly used in engine driven vehicles, which is disengageable by forward movement of a clutch release bearing 26 mounted upon an axially movable clutch release bearing sleeve 28, to engage the clutch release levers 30 of the clutch operating mechanism 24. Axial movement of the sleeve 28 is controlled by a clutch release fork 32 pivoted at 34 in the conventional manner.

In vehicles of this type, the plates of the clutches wear quite rapidly due to overheating resulting from the frequent engagement and disengagement of the clutch. This invention contemplates reduction of clutch wear resulting from this frequent operation by the provision of means for cooling the clutch plate to prevent overheating. Clutch housing lower half 36, is provided with openings 38 as air intake ports which are covered by a screen 40 to prevent ingress of foreign solid particles. Bell housing 10 is provided with an opening 42 as an air outlet port. The clutch cover 44 is provided with a plurality of fins 46 extending radially from its periphery and serving as fan blades for forcing air through the outlet ports 42. A plurality of openings 48 are formed through the clutch cover 44 to permit outward movement of air from within the clutch cover. An air baffle, formed of a pair of vertically aligned plates 50 and 52 having mating central semi-circular openings 54 and 55 formed therethrough defining an annular orifice surrounding the sleeve 28, directs air through a rear end opening 56 in the clutch cover 44. The rotation of clutch cover 44, which is fixed to the flywheel 22, forces air through the outlet port 42 and thereby induces flow of air from the inlet port 38, through the mating air baffle openings 54—55, clutch cover opening 56, clutch cover peripheral openings 48, and through the outlet port 42 to thus provide a stream of air for cooling the clutch plates.

A shaft 58, which is driven directly by the clutch 24, and a transmission power input shaft 60 are journalled in the drive mechanism housing structure for rotation about a common axis. The adjacent ends of these shafts extend within the creeper gear unit 14 wherein they may be either directly coupled for unitary rotation or coupled for rotation through reduction gearing, as will be explained in detail presently.

*Drive mechanism housing structure*

The drive mechanism housing structure comprises upper and lower housing halves for the clutch, creeper gear, and transmission units separable in a parting plane passing through the common axis of shafts 58 and 60. The lower and upper housing halves of the clutch, creeper gear, and transmission units have been designated respectively 36, 62, 64, 66, 68, and 70. The three lower housing halves are secured together to form a unitary structure, housing halves 36 and 64 being secured together by bolts 72, and housing halves 64 and 68, by bolts 74. The three upper housing halves are likewise secured together to form a unitary structure, housing halves 62 and 66 being secured together by bolts 76, and housing halves 66 and 70, by bolts 78.

As may be seen by reference to Figure 3, the upper and lower housing halves 66 and 64 of the creeper gear unit are provided respectively with mating laterally extending flanges 80 and 82 which are secured together by bolts 84. Referring to Figure 2, clutch unit upper housing half 62 and transmission unit upper housing half 70 are likewise provided with laterally extending flanges, 86 and 88 respectively which mate with laterally extending flanges, not shown, on the corresponding lower housing halves and are secured together respectively by bolts 90 and 92. Clutch housing upper half 62 is provided with a peripheral flange 94 mating with an internal flange 95 on bell housing 10 and secured thereto by bolts 96. Since, as will be noted by reference to Figures 1 and 4, there is no piloting boss formed on housing half 62 for engagement with bell housing 10, the three upper housing halves 62, 66, and 70 may be removed from the three lower housing halves as a unit. As will become apparent as this detailed description proceeds, this housing structure greatly facilitates servicing and replacement of parts of the drive mechanism and especially of the clutch units.

*Interconnection of transmission and creeper gear units*

As is shown in Figure 4, the transmission unit power input shaft 60 is journalled at its rear end by anti-friction bearing 98 and at its forward end by an anti-friction bearing 100. Bearing 98 is mounted within mating semi-circular recesses defining a circular aperture through the rear wall of the transmission unit upper and lower housing halves 70 and 68, being fixed in position in that aperture against forward movement by a retainer ring 102 and against rearward movement by a bearing cover member 104 which is formed with an annular wall 106 which abuts against the outer bearing race of bearing 98 and which is secured to both the upper and lower transmission unit housing halves 70 and 68 by bolts 108 and 110 respectively. Bearing 100 is mounted within a sleeve or bearing cage 112 which is provided with a radially extending flange 114 at its forward end. Sleeve 112 extends through an aperture defined by mating semi-circular recesses formed in the forward wall of transmission unit upper and lower housing halves 70 and 68 and is secured to these walls by machine screws 116 and 118 respectively.

A gear member 120, is fixed to the transmission power input shaft 60 by a spline connection 122 at the forward end thereof and fixed against forward axial movement by a retainer ring 126. Shaft 58, which, as previously mentioned, is coaxially aligned with power input shaft 60, is journalled at its rear extremity by an anti-friction bearing 128 mounted within a recess 130 formed within the forward face of gear 120 and by an anti-friction bearing 132 positioned centrally of shaft 58 and mounted within an aperture formed by mating semi-circular recesses within the forward walls of the lower and upper creeper gear housing halves 64 and 66.

Axial movement of bearing 132 is prevented by the co-action of retainer ring 134 and the radial flange 136 of the sleeve 138 through which the shaft 58 extends and upon which the clutch release bearing sleeve 28 is mounted for reciprocation. Sleeve 138 is fixed to the forward walls of creeper gear unit housing halves by three equally spaced screws 139 passing through flange 136 and threadedly engaged with the forward walls of the housing halves of the creeper gear unit.

A collar 140 of the driven member of the clutch mechanism 24 is splined to the forward extremity of the clutch shaft 58 as indicated at 142 to impart rotation to the shaft 58 as long as the clutch is engaged.

As previously indicated shaft 60 may be either coupled directly to or driven from shaft 58 through suitable reduction or creeper gearing. The mechanism controlling this alternative drive connection will now be described.

Shaft 58 is formed with an enlarged externally splined portion 144 adjacent the pilot bearing 128 and the gear member 120. Intermediate enlarged portion 144 and anti-friction bearing 132, a gear 146 is journalled for rotation upon the shaft 58, being separated from the anti-friction bearing 132 by a spacer 148. Collar 150 is provided externally with a peripheral groove 152 and internally with a spline or clutch teeth 154. Teeth 154 are constantly in interlocking engagement with the external spline teeth formed upon the enlarged portion 144 of shaft 58. A shifting fork 156, pivoted at 158 and actuated by a lever 160, is provided with a pair of lugs 162 engaging the external peripheral groove 152 of the clutch collar 150 to position the same axially of the shaft 58. Gear member 120 and gear 146 each have formed integrally therewith an external row of clutch or spline teeth, which are designated respectively as 164 and 166, and which correspond in number and size to the external teeth of the enlarged portion 144 of shaft 58. Collar 150 is slidable axially of shaft 58 enlarged portion 144 to alternatively engage the row of teeth 164 or 166.

A detent member 168 which is mounted for movement within a recess formed radially in the enlarged portion 144 and biased outwardly by a spring 170, coacts with the oppositely sloping surfaces 171 formed on one of the spline teeth 154 to force the collar 150 to one of its two possible extreme axial positions. Collar 152 has no neutral or intermediate position but is either in engagement with the teeth 164 on gear member 120 or with the teeth 166 on gear 146 so that it is effective either to impart rotary movement directly to the power input shaft 60 of the transmission unit 16 or to drive the power input shaft 60 through the intermediary of creeper gearing.

A gear cluster 172, which is formed with gear teeth 174 and 176 in constant mesh respectively with gear member 120 and gear 146, is journalled for rotation by bearing 178 upon a shaft 180 which is mounted in aligned apertures in the forward and rear walls of the creeper gear housing lower half 64 and fixed therein by a set screw 182. In the position of collar 150 as shown in Figure 4, rotary motion is transmitted directly from clutch shaft 58 to power input shaft 60. When collar 150 is shifted to its forward position to couple gear 146 to the enlarged portion 144 of the shaft 58, rotary motion is transmitted from clutch driven shaft 58 to shaft 60 through collar 150, gear 146, gear cluster 172 and gear 120. Since collar 150 has no neutral position, rotation is always imparted to power input shaft 60 from clutch shaft 58 regardless of the shifted position of collar 150. All gears within the creeper gear assembly are constantly rotated so long as the clutch 24 is engaged.

Referring to Figure 9, it will be noted that if gear reduction provided by the creeper gearing mechanism is found to be not necessary or desirable for a particular job shafts 58 and 60 may be readily replaced by a single shaft 183. Due to the improved housing construction whereby the housing structure is formed of separable upper and lower housing halves having a parting plane coinciding with the axes of the coaxially aligned clutch driven shaft 58 and transmission unit power input shaft 60, this replacement may be made in the field by the user to meet changing requirements of the vehicle. Since shaft 183 is journalled in bearings 98 and 100 no forward bearing, such as 132 is needed when a single shaft is used. A flanged ring 133 is substituted for bearing 132 and retainer 134.

*Transmission unit*

A transmission unit 16 is provided with three main shafts, power input shaft 60, an intermediate shaft 184, and a power output shaft 186, all journalled for rotation within the tranmission unit housing about spaced parallel axes. Power input shaft 60 is journalled as previously described, intermediate shaft 184, at its opposite ends by anti-friction bearings 188 and 190 which are mounted in aligned apertures in the rear and forward walls respectively of the transmission unit housing structure lower half 68; and power output shaft 186, at its opposite ends by anti-friction bearings 192 and 194 mounted in aligned apertures in the rearward and forward walls of the transmission unit housing structure lower half 68. The intermediate shaft 184 is longitudinally externally splined throughout its length between bearings 188 and 190. Three gears, 196, 198 and 200, which are formed with internal splines mating with the external spline of shaft 184, are mounted on and for rotation with shaft 184, gear 196 being in abutment at its rearward face with the internal race of bearing 188 and with the rearward face of gear 198 at its forward face. A spacer 202 is mounted upon the shaft 184 intermediate gears 198 and 200. Gear 200 abuts the inner race of bearing 190.

Power input shaft 60 is centrally formed with an enlarged externally splined portion 204 adjacent each side of which a gear is mounted for rotation upon the shaft 60, these gears being designated as 206 and 208. Spacers 210 and 212 are mounted upon the shaft 60 intermediate the inner race of bearing 98 and gear 206 and the inner race of bearing 100 and gear 208 respectively to maintain the predetermined axial relationship of the parts mounted upon shaft 60. Gear 206 is in constant mesh with gear 198 fixed to the intermediate shaft 184 while gear 208 is in constant mesh with an idler gear 214 mounted for rotation upon a counter shaft 216 supported within the transmission unit housing structure lower half 68 such that its axis is spaced from and parallel to the axes of the power input and intermediate shafts. Idler gear 214 in turn meshes with gear 200 fixed to the intermediate shaft.

A shifting collar 218 which is formed with an external peripheral groove 220 and internal spline tooth 222, is mounted upon the enlarged externally splined portion 204 of shaft 60. Gears 206 and 208 are each formed with a row of spline or clutch teeth adjacent the enlarged portion 204 of shaft 60 designated respectively 224 and 226. These clutch teeth correspond in number and size to the external teeth on the enlarged portion 204 and are adapted for engagement by the internal teeth 222 of collar 218. A shifting fork 228, pivoted at 230 and actuated by a lever 232, is provided with inwardly extending lugs 234 engaging the external peripheral groove 220 of collar 218. The collar 218 may be shifted axially of the enlarged portion 204 of shaft 60 for alternative engagement with the row of teeth 224 of gear 206 or the row of teeth 226 of gear 208 by the actuation of lever 232. A detent member 236, which is mounted for radial movement within a recess formed in the enlarged portion 204 of shaft 60, is urged radially outward by a spring 238 into engagement with oppositely inclined surfaces 239 formed on one of the internal teeth 222 of the collar 218. Collar 218 is forced by detent 236 to one of its two possible extreme axial positions and is either in engagement with drive gear 206 or drive gear 208. Thus, depending upon the shifted position of collar 218 as controlled by lever 232 through shifting forks 228, either forward or reverse rotation can be imparted to intermediate shaft 184. When a neutral position is desired, a central groove can be provided on the one of the internal teeth 222 contacted by detent 236 intermediate the inclined surfaces 239. Such alternate construction is shown in Figure 10 wherein a modified collar 218' has been substituted for collar 218.

Within the transmission unit housing structure lower half 68 a pair of gears 240 and 242 are journalled for rotation upon the power output shaft 186 and are in constant mesh respectively with intermediate shaft gears 196 and 200. Spacers 244 and 246 are provided for axial separation of gear 240 from othe inner race of bearing 192 and of gear 242 from the inner race of bearing 194. A short sleeve 248 is internally splined for engagement with an external spline formed centrally upon the shaft 186 and axially fixed thereon between the hubs of the gears 240 and 242. Sleeve 248 is provided also with external spline teeth 250, which are constantly engaged by the internal spline teeth 252 formed within a collar 254 mounted for axial movement relative thereto. The hubs of gears 240 and 242 are each formed with an external row of spline teeth adjacent the sleeve 248 which are designated respectively 256 and 258. A shifting fork 260, pivoted at 262 and actuated by lever 264, is provided with inwardly extending lugs 266 which engage with an external peripheral groove 268 formed on collar 254. A detent member 270, which is mounted for radial movement within a recess formed through sleeve 248 and into shaft 186, is urged outwardly by a spring 272 into engagement with the edge of an aligned spline tooth formed internally of collar 254. The edge of the engaged tooth is formed with a central notch and at each end thereof with an inclined edge surface. Detent member 270, by engagement with one of the edge surfaces or with the notch, is effective to hold collar 254 in one of three positions, to the rear to establish a driving connection betwen gear 240 and shaft 186, in a neutral position in which neither gear 240 nor 242 is drivingly coupled to output shaft 186, or in a forward position to establish a driving connection between gear 242 and power output shaft 186.

To briefly recapitulate, lever 160 controls the axial position of collar 150 to alternatively directly couple clutch drive shaft 58 to power input shaft 60 or establish a drive connection from clutch shaft 58 to power input shaft 60 through the creeper gear cluster 172. Lever 232, which is a two position lever, as shown, and which may be a three position lever if a neutral position is desired, is operable to shaft collar 218 to establish a forward or a reverse drive gear connection between power input shaft 60 and intermediate shaft 184. Shift lever 264 is a three position lever, having a central neutral position and high and low speed engaged positions for coupling the power output shaft 186 for high or low speed drive from the intermediate shaft 184. It should be noted that regardless of the position of the shift levers 160, 232 or 264, all gears of the drive mechanism thus far described are constantly rotating so long as rotation is imparted to the clutch shaft.

*Transmission and creeper gear unit lubrication*

Within the transmission unit housing structure upper half 70 above the axis of the power input shaft 60, open top oil receptacles 274 are formed at opposite sides of the bearing 98. As is best shown in Figure 5, a channel 276 is formed through the housing 70 and the annular wall 106 of the cover 104 so that oil can flow from the receptacles 274 into the recess 278 formed internally of the cover member 104. Since bearing 98 is provided internally of the housing structure with a shield 280, oil will accumulate with the recess 278. Shaft 60 is provided with an axial bore 282 which is formed with spiral rifle grooves and which extend over the major portion of the length of the shaft 60. A coaxial aperture 284 of smaller size than the bore 282 extends through the remainder of the shaft 60. Radial oil distributing channels 286 and 288 lead radially from the rifled bore 282 through the shaft 60 centrally of the bearing surface of the gears 206 and 208 for lubrication thereof. In operation, since, so long as rotation is imparted to the clutch shaft 58, rotation is imparted to all of the gears within the transmission unit 16, oil will be carried by the gears from the oil bath in the bottom of the transmission unit housing lower half 168 and thrown thereby against the interior of the top wall of the transmission housing upper half 70. Part of the oil will flow down the housing side walls into the open top receptacles 274. From receptacles 274, oil will flow through channels 276 into the recess 278. The spiral grooves formed within the bore 282, which are of such inclination relative to the direction of shaft rotation to feed oil from the recess 278, feed oil forwardly through the shaft for distribution to bearings of gears 206 and 208 by oil channels 286 and 288. A part of the oil fed by the spiral grooves will pass through the forward apertures 284 to lubricate the pilot bearing 128 within the creeper gear unit 14. Clutch shaft 58 is provided with spiral grooves 289 of such inclination relative to clutch shaft rotation that rotation of the shaft 58 will pump any oil tending to pass through sleeve 138 back through the bearing 132 into the case of the creeper gear unit 14 via channel 289A.

A modified lubrication system for the gears 206 and 208 is shown in Figure 10. This lubrication system differs from that previously described in that a smooth bore 282' is formed coaxially through the rear end portion of the transmission unit power input shaft 60' in lieu of the rifled bore 282 of the previous embodiment and in that an oil baffle 277 having lubricant feeding tube 279 protruding into the open end of bore 282' is mounted within the recess 278. Oil baffle 277, which is generally cup-shaped, is formed within peripheral flange 277' which, in the assembled mechanism, is held between the end of wall 106 and the outer race of bearing 98. In this modified structure, oil flows from the receptacle 274 through the channels 276 into the chamber formed between the oil baffle 277 and the wall of recess 278. Due to the reduced volume of this chamber, the level of the oil in this chamber will be higher than that in the previous modifications. Oil flows from this chamber through the tube 279 into the bore 282' for distribution to the bearing surfaces of gears 206 and 208. The oil level in the chamber formed by baffle 277 and recess 278 is sufficiently high to develop a slight pressure head feeding bore 282'.

*Disassembly operation for servicing*

In order to remove shafts 58 and 60 and the parts mounted thereon, it is first necessary to remove the upper housing halves 62, 66 and 70. Since bearing cap 104, bearing cage 112, and sleeve 138 are all fixed to the walls of both the upper and lower housing halves with which they are associated, cap 104 must be taken off by removing its mounting screws 108 and 110; cage 112 must be disengaged from upper housing half 70 by loosening the upper screw 116; and sleeve 138 must be disengaged from housing half 66 by removing upper screw 139. As may be seen by reference to Figure 7, the upper screw 116 passes through a peripheral slot 290 on the flange 114 of cage 112, so that loosening of upper screw 116 is sufficient to disengage cage 112 from housing half 70. After the upper housing halves have been unbolted from the lower housing halves and from the bell housing 10, as has been described in detail previously, the upper housing halves may be lifted from the assembly.

The shafts 58 and 60 and the various parts mounted thereon may be removed after loosening the lower pairs of screws 118 which pass through peripheral slots 291 on flange 114 of cage 112 as is shown in Figure 7 and the lower pair of screws 139 which pass through peripheral slots 292 in the flange 136 of sleeve 138. Shafts 58 and 60 and the parts mounted thereon may now be lifted by tilting the rear end upward slightly until the flanges 136 and 114 of sleeve 138 and cage 112 are clear of the semi-circular recesses in the forward walls of lower housing halves 64 and 68 respectively and then moved to the rear to disengage shaft 58 from its spline connection with collar 140 of the driven clutch member. The tilting of the shafts in removal is possible due to the flexibility of the clutch disk and the clearances between the several parts of the assembly permitting sufficient axial movement thereof during removal of the assembly. In assembly, the procedure is, of course, reversed.

The improved housing structure and manner of connection of the several parts thereto greatly facilitates replacement of the clutch plates and servicing of the parts of the drive train when necessary and permits the user of the vehicle to replace the creeper gearing and shafts 58 and 60 by a single shaft as illustrated in Figure 9 when and if necessary.

Differential and hub reduction gearing

As is best shown in Figure 1, a spiral bevel pinion 293 is formed integral with the rear extremity of the differential unit power output shaft 186. Pinion 293 is in constant mesh with a spiral bevel ring gear 294 of a differential mechanism 296. As is best illustrated in Figure 2, differential mechanism 296 is generally conventional in design. The housing 298 of the differential unit 18 is secured to a flange 299 formed on the rear wall of the transmission unit housing lower half 68 by bolts 300 and has an axle housing 302 fixed to each side thereof. Axle housings 302 are each provided with an enlarged inner end portion 304 which fits snugly within aligned apertures 306 and 307 formed through the opposite side walls of the housing 298 and are provided with radially extending flange portions 308 by which they are suitably secured to the differential housing 298 by bolts 310 passing therethrough. The differential mechanism 296 is suitably journalled for rotation within the housing 298 by anti-friction bearings 312 and 314 supported within recesses formed within the inner ends of the enlarged portions 304 of each axle housing 302. A suitable number of shims 315 may be interposed between flange 308 and housing 298 for proper adjustment of the bearings 312 and 314.

A sleeve member 316, which is of sufficient length to extend beyond the outer extremity of the axle housing 302 and which is externally splined at its outer end as indicated at 318, fits snugly within the axle housing 302 and is fixed relative thereto by a set screw 320. Concentrically mounted within each of the sleeves 316 is an axle shaft 322, which is splined as at 324 to a corresponding side gear 326 of the differential mechanism 296 and which has a spur gear 328 formed integrally therewith at its outer end. By this construction, the shafts 322 are driven by the differential mechanism 296 while sleeves 316 and housings 302 remain stationary at all times relative the differential housing 298.

The wheel shell 330, which is mounted for rotation about the axis of the sleeve 316 by anti-friction bearings 332 and 334, the outer races of which are received within oppositely facing recesses formed within flanges 336 and 338, which are formed integral with and extending radially inward of shell 330. Bearings 332 and 334 are tapered roller bearings which are oppositely directed. The inner race of bearing 334 abuts the end of housing 302 and a lock nut 339 threadedly engaged with sleeve 316 abuts the inner race of bearings 332 to provide an adjustable means for preloading the bearings. An annular wheel support member 340 to which the wheel rims 341 are suitably secured in the conventional manner, is provided with an inwardly extending flange 342 in juxtaposition with an external flange 344 formed on the wheel shell 330 and is suitably secured thereto by bolts 346.

Power is transmitted from the shaft 322 to the wheel shell 330 through a planetary gear type reduction drive mechanism of an improved form now to be described. In this planetary gear type mechanism, an internal annular gear 348 is fixed against rotary movement by being splined at 318 to the fixed sleeve 316. A spider 350 is fixed to the wheel shell 330 by bolts 352 external of the gear 348. An annular retainer member 354 is fixed to the spider 350 by machine screws 356 in concentric relation with the shaft 322 and the wheel shell 330, suitable spacers 358 being provided so that its path of rotation lies on the differential unit side of the gear 328. A plurality of pinions 360, which are in constant mesh with the teeth of the internal annular gear 348 and with the gear 328, are journalled for rotation upon stub shafts 362 which are suitably supported in aligned apertures formed through the spider 350 and the annular retainer 354 in spaced parallel relation with the axis of shaft 322. As is best shown in Figure 8, rotation of gear 328 by shaft 322 causes pinions 360 to planetate about the axis of shaft 322 and thus impart rotary motion to the spider 350. Since the wheels, wheel support member 340, wheel shell 330 and spider 350 upon which the pinions 360 are journalled for rotation by shaft 322, are fixed together for conjoint rotary movement, rotary motion thus imparted to spider 350 from shaft 322 drives the wheels.

As is shown in Figure 2 a substantially conventional brake assembly 364 is fixed to a radially extending flange 366 formed integral with the axle housing 302 by rivets 368. Brake mechanism 364 coacts with an internal brake drum 370, which is fixed to the wheel shell 330 by bolts 372, for arresting rotation of the wheels.

Holding brake mechanism

Referring once again to Figure 4, it will be noted that a brake drum 374 is fixed, relative to transmission unit power output shaft 186 forward of the bearing 194, by bolts 376 to the flange portion 378 of a sleeve 380 which is splined as at 382 on the forward end portion of the transmission unit power output shaft 186 and axially fixed thereon by a nut 384 threadedly engaged with the forward extremity of the shaft 186 to hold the sleeve 380 tightly against the inner race of anti-friction bearings 194. As will be seen by reference to Figure 3, an external brake shoe 386 which is pivotally mounted on the differential housing lower half 68 at 388 and which is provided with an operating link 390, coacts with an internal brake shoe 391 pivotally connected thereto by link 392 to engage the brake drum 374 both internally and externally to inhibit rotation of transmission unit power output shaft 186. By this novel arrangement the holding brake is much more effective than in the prior art holding brake arrangements for vehicles having a differential mechanism directly driven by the transmission power output shaft, because, by the present improved arrangement, the brake mechanism acts directly upon the transmission unit power output shaft 186 on which the differential drive pinion 293 is fixed at its opposite end. By this construction, therefore, the holding force of the brake is greatly amplified due to the mechanical advantage attained through reduction gearing of the differential mechanism 296 and the hub planetary gearing and is therefore much more effective. It should further be noted, that the holding brake, due to the improved arrangement of the gearing and shifting mechanism of the transmission unit is effective regardless of the shifted position of any of the shifting forks.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle drive train having a housed engine driven flywheel, a disc type friction clutch having an input member coaxially connected to said flywheel and an output member, a shaft mounted for rotation coaxially with said flywheel upon spaced antifriction bearings, means forming a spline connection between said shaft and said clutch output member, change speed and reverse drive gearing selectively connectible in drive relation to said clutch connected shaft, a rotatable output shaft driven by said gearing, a two part clutch housing fixed to the housing of said flywheel, one of said clutch housing parts being separably bolted to the other and to said flywheel housing to permit access to said clutch for maintenance and replacement purposes, a transmission housing enclosing said gearing and providing spaced seats for said bearings and journal supports for said output shaft, said transmission housing being fixed to said clutch housing and including a separable portion which may be removed while maintaining the support of said bearings by the remainder of said transmission housing, removal of said portion and said one clutch housing part permitting axial separation of the spline connection between the first said shaft and said clutch output member and clutch disassembly or removal.

2. The combination defined in claim 1 wherein said transmission housing portion is separable from the remainder of said transmission housing in a parting plane including the axis of said clutch connected shaft.

3. The combination defined in claim 1 wherein said transmission housing portion is fixed to said one clutch housing part and removable therewith from the remainder of said transmission housing and from said other clutch housing part as a unitary subassembly.

References Cited in the file of this patent

UNITED STATES PATENTS

| | | |
|---|---|---|
| 1,417,795 | Cook et al. | May 30, 1922 |
| 1,427,502 | Torbensen | Aug. 29, 1922 |
| 1,813,494 | Hernandez | July 7, 1931 |
| 1,827,582 | Jacobs | Oct. 13, 1931 |
| 2,072,380 | Pfeiffer | Mar. 2, 1937 |
| 2,085,814 | Matthews | July 6, 1937 |
| 2,107,954 | Morton et al. | Feb. 8, 1938 |
| 2,134,109 | Eckert | Oct. 25, 1938 |
| 2,205,629 | Peterson | June 25, 1940 |
| 2,214,806 | Baker et al. | Sept. 17, 1940 |
| 2,316,503 | Curtis | Apr. 13, 1943 |
| 2,349,064 | Weaver | May 16, 1944 |
| 2,487,735 | Sherman | Nov. 8, 1949 |
| 2,500,308 | Campodonico et al. | Mar. 14, 1950 |
| 2,512,856 | Fisk | June 27, 1950 |
| 2,543,811 | Snow et al. | Mar. 6, 1951 |